(12) United States Patent
Nazara

(10) Patent No.: US 7,354,119 B2
(45) Date of Patent: Apr. 8, 2008

(54) BRAKE SYSTEM

(76) Inventor: Joel Nazara, 73-4776 Kanalani St., #10, Kailua Kona, HI (US) 96740

( * ) Notice: Subject to any disclaimer, the term of this patent is extended or adjusted under 35 U.S.C. 154(b) by 250 days.

(21) Appl. No.: 11/236,234

(22) Filed: Sep. 27, 2005

(65) Prior Publication Data

US 2007/0069574 A1    Mar. 29, 2007

(51) Int. Cl.
B60T 8/36    (2006.01)

(52) U.S. Cl. .................. 303/125; 303/10; 188/152; 267/120

(58) Field of Classification Search .............. 74/413; 303/125, 10; 188/266, 151 R, 152; 91/437; 267/120
See application file for complete search history.

(56) References Cited

U.S. PATENT DOCUMENTS

| | | | | |
|---|---|---|---|---|
| 1,658,960 A * | 10/1928 | Adams | ................. | 188/295 |
| 3,497,039 A * | 2/1970 | Hardie et al. | ............. | 188/180 |
| 4,901,529 A * | 2/1990 | Iino et al. | ............... | 60/489 |
| 5,368,137 A * | 11/1994 | Clemens | ............. | 188/71.5 |
| 5,465,817 A * | 11/1995 | Muscatell | ............. | 188/295 |
| 6,102,490 A * | 8/2000 | Ko | ............. | 303/10 |
| 6,360,854 B1 * | 3/2002 | Hwang | ............. | 188/151 R |
| 6,513,631 B2 * | 2/2003 | Hwang | ............. | 188/151 R |
| 6,688,706 B2 | 2/2004 | Chang | ............. | 303/115.4 |
| 6,709,072 B2 | 3/2004 | Kusano et al. | ........... | 303/113.4 |
| 6,851,763 B1 | 2/2005 | Feigel | ............. | 303/114.1 |
| 6,880,900 B2 | 4/2005 | Hara et al. | ............. | 303/170 |
| 6,942,071 B1 * | 9/2005 | Cannata et al. | ......... | 188/151 R |
| 7,213,691 B2 * | 5/2007 | Cannata et al. | ............. | 188/295 |

* cited by examiner

Primary Examiner—Chris Schwartz
(74) Attorney, Agent, or Firm—Greer, Burns & Crain, Ltd

(57) ABSTRACT

A brake system for a vehicle has a brake pedal and at least one rotational part. The brake system further includes a shaft connectable to the rotational part, and a first fluid control unit configured for being filled with fluid and actuating in response to manipulation of the brake pedal. In addition, at least two cylinders in fluid communication with the first fluid control unit are provided. Each cylinder has a first cylinder end having an associated reciprocating piston and a second cylinder end configured for connection to the vehicle. The brake system also includes a linkage, connected to the at least one first cylinder end of a respective reciprocating piston and to the shaft to provide balanced operation of the reciprocating pistons upon rotation of the shaft. Furthermore, the brake system includes a second fluid control unit communicating with the first fluid control unit and configured for regulating pressure in the cylinders by controlling fluid flow between the first fluid control unit and the cylinders.

20 Claims, 4 Drawing Sheets

BRAKE SYSTEM

BACKGROUND OF THE INVENTION

The present invention relates generally to brake systems, and more specifically to a frictionless brake system employing fluid power cylinders.

Vehicular brake systems incorporating frictional or abrasive devices are known in the art. For example, typical brake systems have a master cylinder that distributes hydraulic fluid upon actuation of a vehicle brake pedal through hydraulic fluid transmission lines. The fluid transmission lines from the master cylinder connect to a fluid distribution system that supplies fluid to both front and rear brakes of the vehicle, such as an automobile. Fluid can also be supplied upon use of a parking brake. Typically, the brakes in conventional vehicles are disk or drum brakes.

In operation, pressure exerted by a driver's foot on the vehicle's brake pedal influences the pressure of the fluid in the master cylinder and distribution system, and hence the pressure of the fluid supplied to the front and rear brakes of the vehicle. For disk brakes, the pressurized fluid from the master cylinder is supplied to a caliper, which presses against a piston under pressure. The piston, in-turn, squeezes a pair of brake pads against corresponding sides of a rotor that is attached to the wheel. Accordingly, frictional forces are created by the brake pads being forced into contact with the rotor, ultimately braking the vehicle.

For conventional vehicle drum brakes, fluid is supplied to a wheel cylinder that outwardly pushes brake shoes against a brake drum. The brake drum is attached to the wheel and rotates therewith. Thus, wheel rotation slows and/or stops when the brake shoes are pressed against the brake drum, ultimately braking the vehicle.

One problem with such abrasive brake systems is that the frictional surfaces or linings of the brake pads/shoes wear over time. Accordingly, it is necessary to periodically monitor and/or replace the brake pads during the lifetime of the vehicle. Moreover, since the pads/shoes have limited frictional surfaces, it is necessary to timely change the pads/shoes before the frictional surface of the pads/shoes is worn away. If the brake pads/shoes are not timely changed, damage to other components of the vehicle, namely the rotor or brake drum can result. Such damage results in increased costs for maintaining the brake system of the vehicle. Additionally, if the brake pads/shoes wear down, then another problem of reduced braking efficiency and/or ability can occur.

Accordingly, there is a need for a braking system that addresses the above-identified drawbacks of existing vehicle braking systems.

SUMMARY OF THE INVENTION

The above-listed needs are met or exceeded by the present improved braking system for a vehicle, which uses fluid cylinders for braking the vehicle. More specifically, a brake system for a vehicle having a brake pedal and at least one rotational part, includes a shaft connectable to the rotational part and a first fluid control unit configured for actuating in response to manipulation of the brake pedal for controlling fluid flow to effect braking force. In addition, the system includes at least two cylinders in fluid communication with the first fluid control unit and each having a first cylinder end having an associated reciprocating piston and a second cylinder end configured for connection to the vehicle. The brake system further includes a linkage, connected to each first cylinder end of a respective reciprocating piston and to the shaft to provide balanced operation of the reciprocating pistons upon rotation of the shaft. A second fluid control unit communicates with the first fluid control unit and is configured for regulating fluid flow between sides of each the cylinders.

In another embodiment, an electronic control unit is contemplated for receiving a signal from the brake pedal and then transmitting appropriate control signals. One control signal actuates the first fluid control unit and another control signal controls the second fluid control unit. The electronic control unit of the present invention is also capable of operating an anti-lock braking system through control of the first fluid control unit and/or the second fluid control unit.

DETAILED DESCRIPTION OF THE PREFERRED EMBODIMENTS

Figure 1:
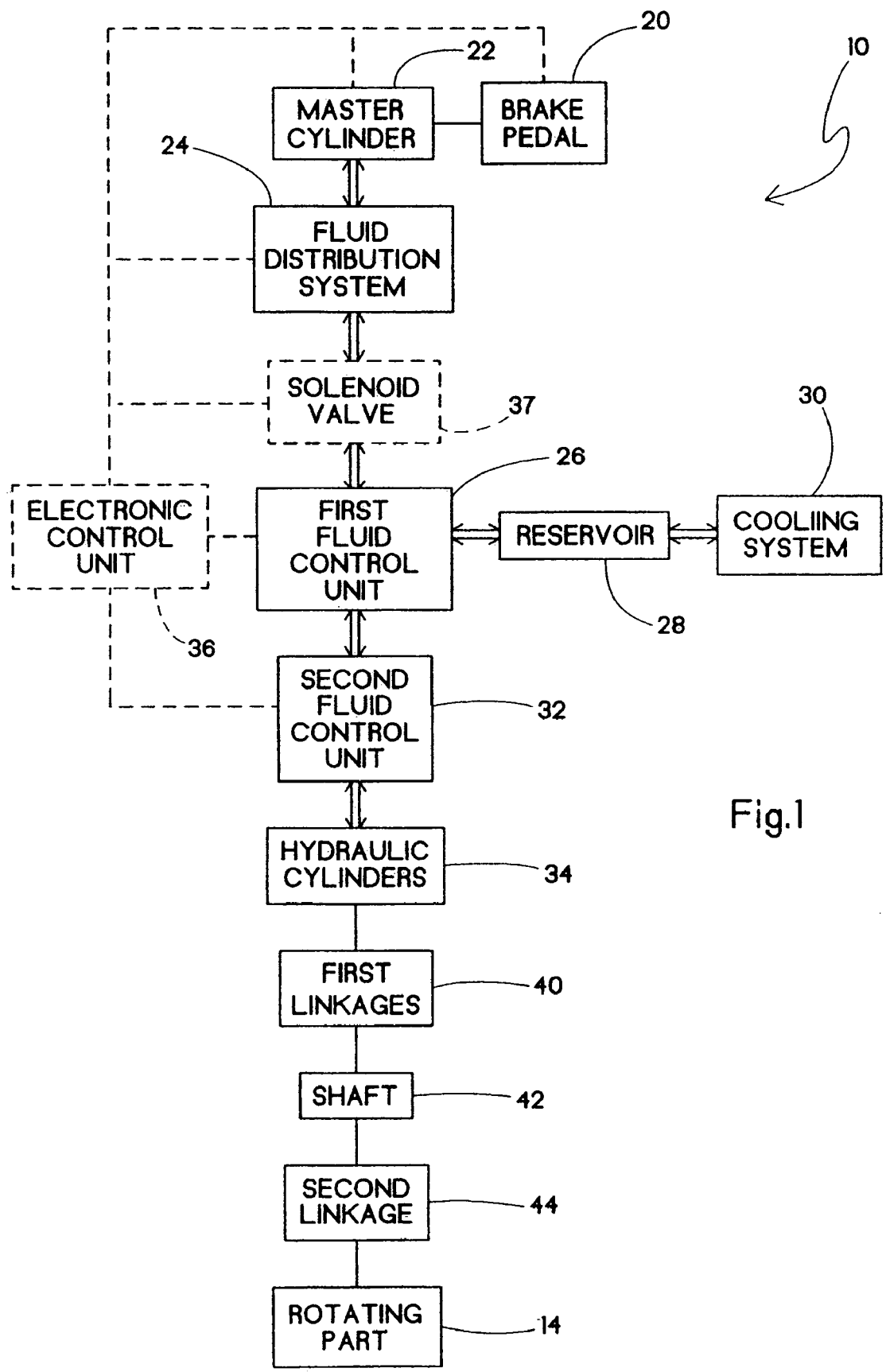
FIG. 1 is a block diagram of the present brake system.
Figure 2:
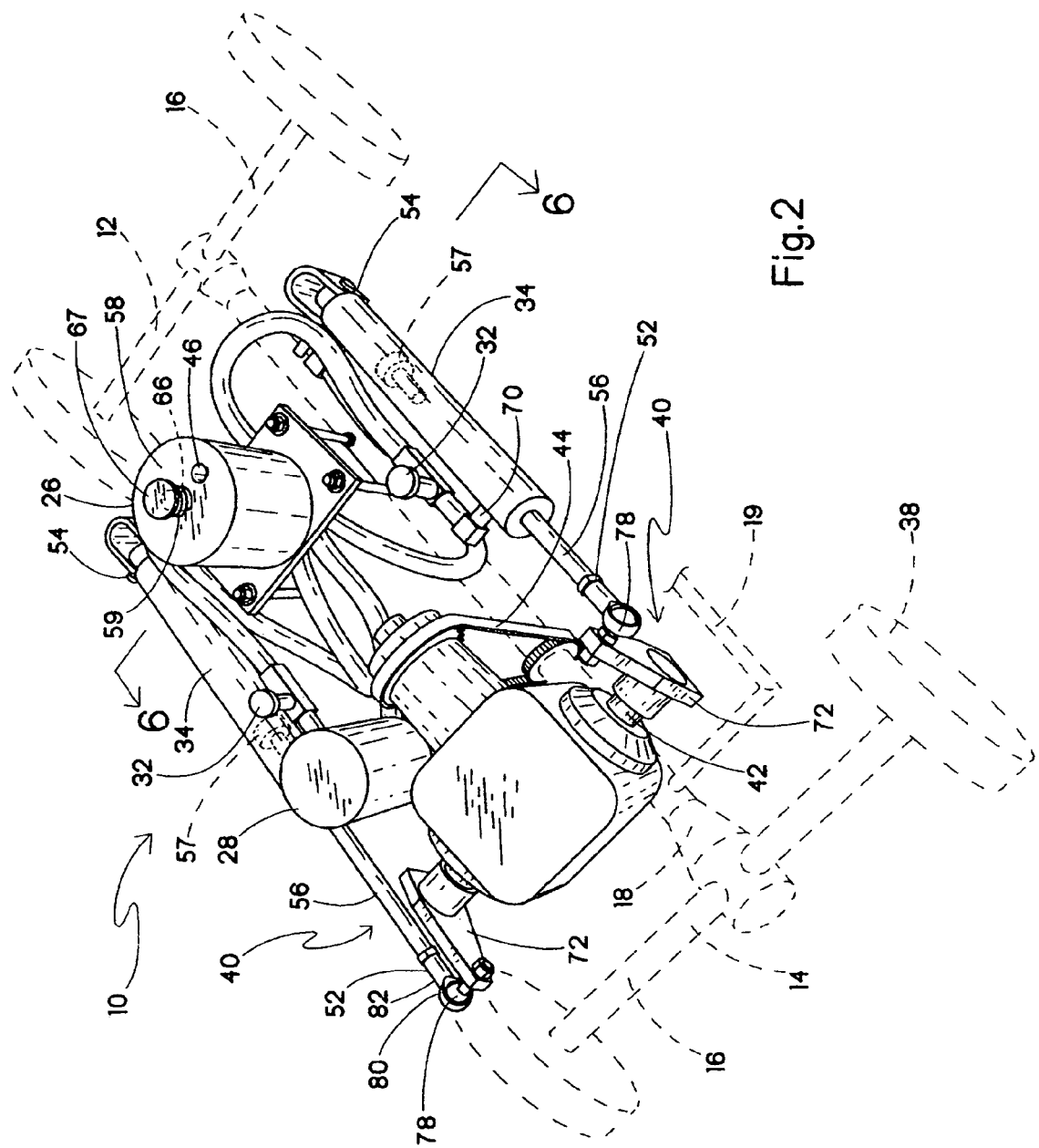
FIG. 2 is a perspective view of the present brake system.

FIGS. 1 and 2 show a brake system generally designated 10, according to the present invention. The present brake system 10 is configured to operate with a vehicle 12 (shown in phantom for clarity), such as an automobile, for slowing or stopping rotation of a rotating part 14 of the vehicle 12. Generally, the rotating part 14 includes either the front or rear axles 16, or alternatively a drive shaft 18 of the vehicle 12. However it is understood by those skilled in the art that the present brake system 10 is modifiable to brake any rotating part of the vehicle. Preferably, the brake system 10 is attachable to an underside (not shown) of the vehicle 12, however other locations are contemplated.

In addition, it will be understood by those skilled the art that the present brake system 10 is configured for being mounted to a frame or chassis 19 of the vehicle 12 having the rotating part 14. The brake system 10 is shown attached to a drive shaft 18 of the vehicle 12 such that the brake system 10 is generally located above the drive shaft. However, it is envisioned that the brake system 10 may be positioned below the drive shaft 18 or adjacent the drive shaft in other embodiments depending upon selected vehicle chassis designs.

The vehicle 12 also includes a brake pedal 20 (FIG. 1). While a pedal is preferred, other brake actuating devices such as levers, buttons, joysticks, etc. are contemplated. As known to those skilled in the art, the brake pedal 20 is preferably connected to a master cylinder 22 (FIG. 1) to push non-compressible fluid therethrough, which applies pressure to brake system components. Generally, the master cylinder 22 is located in an engine compartment, however other suitable locations are contemplated. Moreover, it is contemplated that the master cylinder 22 can be provided as two completely separate master cylinders in one housing, such that fluid, such as hydraulic fluid, can be distributed to more than one brake system as is known in the art. In this manner, loss of fluid in one of the brake systems due to rupture or tear of brake lines or vehicle components would not impair the second brake system. That is, one master cylinder can provide fluid pressure for the front brakes, while the other master cylinder provides fluid pressure to the rear brakes so that if either master cylinder fails, the car can still be braked. Although hydraulic fluid may be used in the present brake system 10, it is envisioned that any other fluid powered systems may be employed.

Referring now to FIGS. 1 and 2, hydraulic fluid flows in a first closed system from the master cylinder 22 to a distribution system 24 and subsequently into a first fluid control unit 26. In a second semi-closed system, fluid flows from the first fluid control unit 26 to a fluid reservoir 28, which is in fluid communication with a cooling system 30. Fluid also flows from the first fluid control unit 26 to a second fluid control unit 32, which is in fluid communication with hydraulic cylinders 34. Unlike the first closed system, however, the second system is semi-closed because air can pass through the uppermost portion of the fluid reservoir 28 to the ambient when pressure within the fluid reservoir exceeds a predetermined value (i.e., when fluid enters the fluid reservoir). Furthermore, air can flow from the ambient into the fluid reservoir 28 when fluid exits the fluid reservoir. Generally, when the first fluid control unit 26 is in the open position, fluid flows generally unrestricted between the first fluid control unit 26, the reservoir 28, and each of the sides of the cylinders 34. Additionally, it is understood that the first fluid control unit 26 maintains separate fluid from the fluid flowing in the distribution system 24 (first closed system) and the fluid flowing to the reservoir 28 and the hydraulic cylinders 34 (second semi-closed system).

The second fluid control unit 32 is configured for restricting fluid flow. The second fluid control unit 32 may be, for example, a hydraulic pressure controlling ball valve, an electronically controlled solenoid valve, or a check valve. Under normal operating conditions, the second fluid control unit 32 is adjusted to a preferred fixed setting which allows a certain amount of fluid to flow into and out of the hydraulic cylinders 34. The particular fixed setting of the second control unit 32 will vary depending upon the size of the cylinders 34 and other components of the system 10, as well as the weight of the vehicle 12. Generally, the second fluid control unit 32 is configured to facilitate a range of braking forces being generated by the first fluid control unit 26 when actuated by the brake pedal 20. That is, when the first fluid control unit 26 is actuated toward a closed position causing fluid flow to be restricted and slowed down, which causes the hydraulic cylinders to pump slower. However, it is envisioned that the second fluid control unit 32 may have multiple fixed setting or be electronically controlled to vary settings depending on a particular application.

In addition to being mechanically connected to the master cylinder 22, the brake pedal 20 is preferably electronically connected to the first fluid control unit 26 and the second fluid control unit 32 through an electronic control unit 36 as shown by the dashed lines in FIG. 1. Accordingly, when the driver presses the brake pedal 20, an electric signal is sent from the brake pedal 20 to the electronic control unit 36. The signal received by the electronic control unit 36 will vary depending on the force applied by the driver to the brake pedal 20. In response to the signal from the brake pedal 20, the electronic control unit 36 controls the amount of braking force applied to the rotating part 14 corresponding to the signal from the brake pedal by controlling a solenoid valve 37, which actuates the first fluid control unit 26 toward a closed position. The first fluid control unit 26 subsequently reduces the rate of fluid flow through the first fluid control unit 26 and hence between sides of the cylinders 34. As flow is restricted by the first fluid control unit 26, resistance to piston movement in the cylinders 34 is increased, thus increasing braking force exerted by the system 10. Although the solenoid valve 37 is shown external to the first fluid control unit 26 for simplicity, it is envisioned that the solenoid valve could be positioned anywhere between the master cylinder 22 and the first fluid control unit to control actuation of the first fluid control unit. The reservoir 28 contains any extra fluid present in the system 10, and is configured to supply or receive fluid depending on the stroke position of the cylinders 34.

While it is preferable to use an Electronic Control Unit for the unit 36, it is also envisioned that mechanical structures can be attached between the brake pedal 20 and the first fluid control unit 26 and the second fluid control unit 32 to control fluid flow between sides of the cylinders 34. Alternatively, the second control unit 32 could be a mechanical valve preset to a fixed setting depending on the desired braking range required for the first fluid control unit 26. Skilled artisans will also recognize that the electronic control unit 36 may be configured to control the first fluid control unit 26 and the second fluid control unit 32 so that an anti-lock braking system (ABS) is created. As is known in the art, with ABS brakes, the electronic control unit 36 controls the braking force so that the braking force is pulsed, instead of constant. As a result of the pulsed braking force, the wheels 38 are less likely to lock up and skid on pavement or the like.

Figure 3:
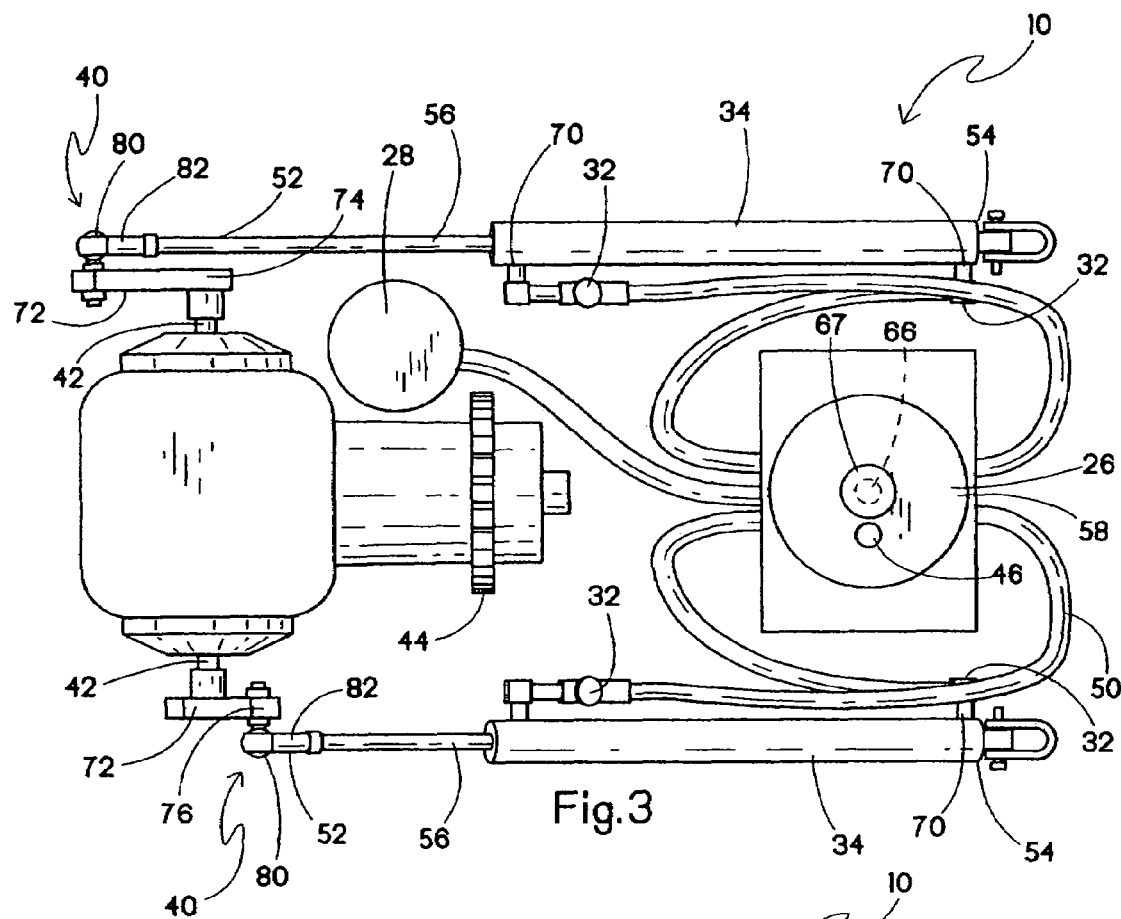
FIG. 3 is a top view of the brake system of FIG. 2.

The cylinders 34 are mechanically linked via first linkages 40 to a rotatable shaft 42. The first linkages 40 may include, for example, a ball joint as shown in FIG. 3. Advantageously, the first linkages 40 have a portion (e.g., the ball joint) that is pivotable so as to compensate for eccentric rotational motions of components attached to the respective first linkages. However, as known to those skilled in the art many different types of linkages may be used. A second linkage 44 connects the shaft 42 to the rotating part 14 of the vehicle 12 and may be, for example, a chain and sprocket. However, as known to those skilled in the art, many different types of power transmission linkages (e.g., gear assemblies, pulleys and endless belts, whether clutched or otherwise interrupted, etc.) may be used.

The present brake system 10 is advantageous over prior art brake systems because it provides generally frictionless braking of the rotating part 14 of the vehicle 12. In particular, when the brake pedal 20 is not actuated, the present brake system 10 permits fluid contained within the brake system to flow between components without any disturbance to minimize or eliminate any drag forces on the brake system. When the brake pedal 20 is actuated, which disturbs or stops the fluid flow by operating (i.e., actuating toward a closed position or closing) the first fluid control unit 26, the brake system 10 slows or stops rotation of the rotating part 14 as discussed above due to drag forces which are produced due to the restriction or stoppage of the fluid flow through the first fluid control unit 26 and to the cylinders 34 and/or reservoir 28, to thereby perform efficient brake operation. As discussed above, while the second fluid control unit 32 is preferably preset at a fixed setting which restricts fluid flow between sides of the cylinders 34 to set a range of braking force for the first fluid control unit 26, the first fluid control unit 26 when actuated toward the closed position reduces the rate of fluid flow or stops fluid flow between the cylinders and the reservoir 28. Accordingly, even after extended time periods, the present brake system 10 advantageously does not present wear or non-operation problems known to occur with conventional brake systems due to frictional forces wearing away brake pads or the like.

Although the present brake system 10 is designed to provide a generally frictionless braking system without the use of friction pads, it is contemplated that a friction-based braking system could be added to the fluid distribution system 24 as a back-up system, if desired. It is also contemplated that the present brake system 10 would be particularly useful as a backup braking system for tractor trailers or the like which require extra braking especially in inclined environments. That is, one problem when tractor trailers travel down steep inclines is that conventional braking systems with brake pads or drums often overheat and fail. In contrast, the present brake system 10 is advantageous over conventional braking systems because of its generally frictionless operation, which does not generate as much heat as conventional brake systems.

Turning now to FIGS. 2-6, the brake pedal 20 is preferably mechanically connected to the brake system's master cylinder 22. The master cylinder 22 includes an internal piston actuated by the brake pedal 20 of the vehicle 12. Furthermore, the master cylinder 22 is in fluid communication with the first fluid control unit 26 via the fluid distribution system 24. Accordingly, upon actuation of the brake pedal 20 by the driver, actuation of an internal piston (FIG. 6) of the master cylinder 22 causes fluid to flow from the master cylinder 22 through the fluid distribution system 24, and to the first fluid control unit 26, which causes the first fluid control unit to actuate from an open position toward a closed position. When the driver releases the brake pedal 20, fluid under pressure returns via the fluid distribution system 24 to the master cylinder 22, which causes actuation of the first fluid control unit 26 toward the open position.

Generally, the first fluid control unit 26 is smoothly actuated from an open position and toward a closed position in response to the user manipulating the brake pedal 20. The first fluid control unit 26 is connected to the fluid distribution system 24 by a fluid distribution system port 46 that allows fluid to flow between the two units. When the first fluid control unit 26 is actuated, an internal fluid piston 48 (FIG. 6) within the first fluid control unit forces fluid to flow out of the first fluid control unit 26 and through at least one of a plurality of hoses 50 to the reservoir 28 (i.e., fluid in the second semi-closed system). Fluid contained in the first closed system flows into the first fluid control unit 26. The two cylinders 34 provided are also in fluid communication with the first fluid control unit 26 via the hoses 50. Although the hoses 50 are shown as flexible tubing, it is envisioned that other forms of tubing, including non-flexible tubing, could be used for one or more portions of the hoses 50.

Furthermore, each of the cylinders 34 includes a first cylinder end 52 and a second cylinder end 54 configured for connection to the frame 19 or other part of the vehicle 12. Each first cylinder end 52 has an associated reciprocating piston with a shaft or rod 56. It is contemplated that the cylinders 34 are reversible and could be connected 180 degrees from that shown in FIG. 3. This type of connection would allow the first cylinder end 52 to be connected to the frame 19 and the second cylinder end 54 to be connected to the shaft 42.

Due to the connection between the cylinders 34 and the first linkages 40, the rotational speed of the shaft 42 decreases due to drag forces when the first fluid control unit 26 restricts fluid flow to and from the cylinders 34. More specifically, drag forces increase when the first fluid control unit 26 restricts or reduces the amount of fluid flowing to the hydraulic cylinders 34 and to corresponding sides of the reciprocating pistons 56 of the cylinders, depending on the stroke position of the cylinders in the system 10. Conversely, when the first fluid control unit 26 is at an open position and allows fluid to flow freely in the hydraulic cylinder 34 between both sides of the reciprocating piston 56, then less drag forces are present. Consequently, as the rotational speed of the shaft 42 decreases, the rotational speed of the rotating part 14 also decreases, and ultimately the vehicle's speed decreases. Thus, rotation of the rotating part 14 is dependent upon rotation of the shaft 42, and ultimately the actuation of the cylinders 34. Finally, as is known to a skilled artisan, if the first fluid control unit 26 (or in alternative embodiments the second fluid control unit 32) does not allow any fluid to flow between sides of the reciprocating pistons 56, then the reciprocating pistons would stop completely.

As best seen in FIG. 2, each first cylinder end 52 of the reciprocating pistons 56 is connected to the shaft 42 using one of the first linkages 40. This configuration provides balanced operation of the reciprocating pistons 56 upon rotation of the shaft 42. That is, each of the first linkages 40 has a configuration that compensates for eccentricity in the rotating components connected to the respective first linkages 40 of the brake system 10 because of the pivoting feature of the first linkages.

Figure 6:
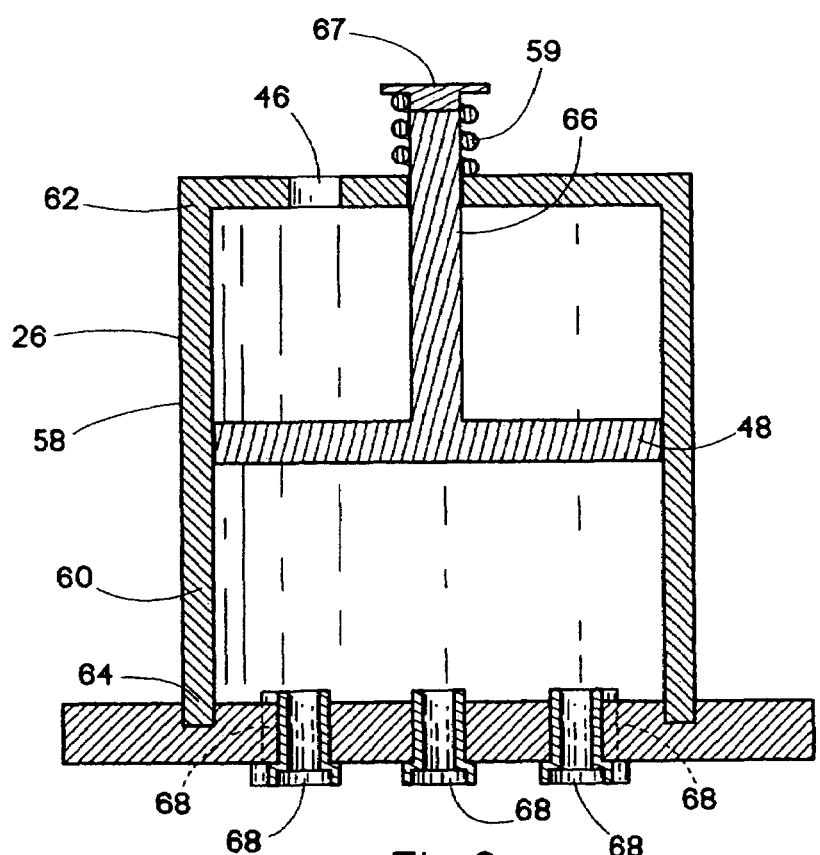
FIG. 6 is a cross-sectional view of the first fluid control unit taken along line 6-6 of FIG. 2 and in the direction generally indicated.

As seen in FIG. 6, the first fluid control unit 26 has a housing 58 in which the fluid piston 48 is located. The fluid piston 48 is configured for reciprocating in the housing 58 between an open or upper position and a closed or lower position as viewed in the figure. In addition, the fluid piston 48 is biased toward the open position by a spring 59. That is, the spring 59 is compressed as the fluid piston moves from the open position and toward the closed position. While a spring 59 is shown biasing the fluid piston 48 toward the open position, it is envisioned that any biasing member can be used to provide a biasing force. Thus, since the spring 59 provides such a biasing force, the vehicle's wheels will be able to rotate generally without resistance from the system 10 because no brake force is applied as a result of the fluid piston 48 being biased in the open position. Conversely, when the piston 48 is actuated to the closed position, then fluid flow is prevented from one side to the other side in each of the cylinders 34, and also between the first fluid control unit 26 and the reservoir 28 and/or cylinders.

As seen in FIG. 6, the housing 58 of the first fluid control unit 26 preferably has a cylindrical member 60 provided with a first housing end 62 and a second housing end 64. The first housing end 62 is configured for receiving a rod 66 having an annular portion 67 located at one end of the rod to secure the spring 59 between the first housing end and the annular portion. The first housing end 62 receives a portion of the rod 66 connected to the fluid piston 48 therethrough, and also has the fluid distribution system port 46. The second housing end 64 has a plurality of fluid exchange ports 68. The fluid exchange ports 68 are connected to either the cylinders 34 via the second fluid control unit 32 or to the fluid reservoir 28, which will be discussed below. In both cases, hoses 50 are used for these connections.

Figure 5:
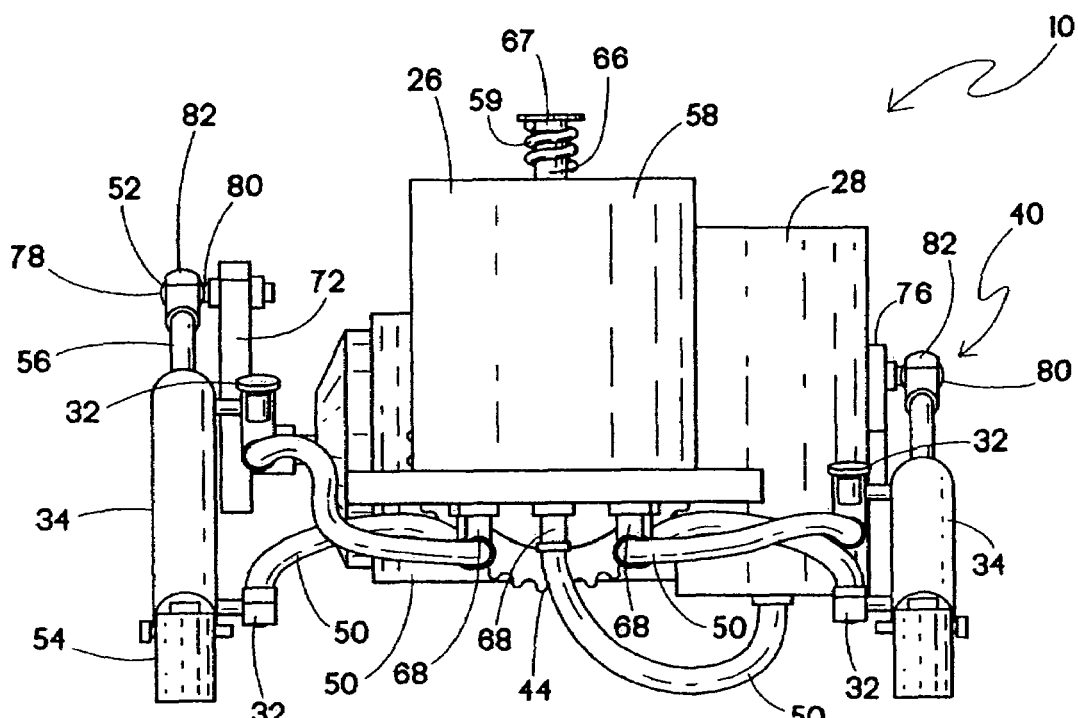
FIG. 5 is a rear view of the brake system of FIG. 2.

Turning to FIG. 5, the fluid reservoir 28 is connected to one of the fluid exchange ports 68 via the hoses 50. When the brake pedal 20 is actuated, the fluid piston 48 in the first fluid control unit 26 causes fluid to flow out of the fluid exchange ports 68 and through the hoses 50. As discussed above, most of the fluid exchange ports 68 are connected to the cylinders 34, while another is connected to the fluid reservoir 28. Generally, fluid flows into the fluid reservoir 28 when the cylinders 34 are filled with fluid. That is, until the fluid piston 48 ceases downward motion and is at the closed position, thus stopping the flow of fluid through the brake system 10. Once the fluid piston 48 begins a reverse motion toward the open position, then fluid can return into the first fluid control unit 26 from the fluid reservoir 28 and/or the cylinders 34, and also begin flowing between the sides of the cylinders 34 unless stopped by the second fluid control unit 32.

The two cylinders 34 further include cylinder ports 70 at each end (FIG. 3). In addition, each cylinder port 70 is separately connected to one of the fluid exchange ports 68 of the first fluid control unit 26. Moreover, the cylinder ports 70 allow the fluid to flow to either the first fluid control unit 26, which allows fluid to flow between sides of the cylinders 34, or the fluid reservoir 28.

Figure 4:
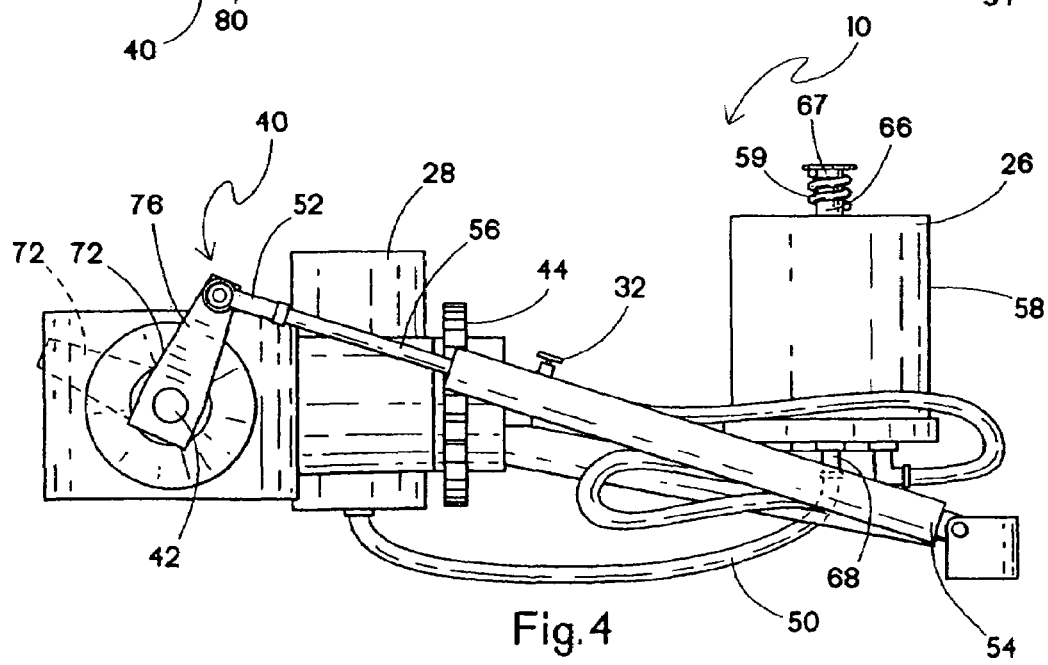
FIG. 4 is a side view of the brake system of FIG. 2.

As shown in FIGS. 2 and 4, the first linkages 40 each include a crank arm 72 having one end 74 that is connected to the shaft 42 and an opposing end 76. Furthermore, each first linkage 40 includes a ball joint 78 having a pivotable end part 80 connected to the opposing end 76 of the crank arm 72 and an elongated end part 82 threadingly connected to the shaft 56 of the first cylinder end 52. Advantageously, the pivotable end part 80 is configured for matching any eccentricity of the shaft 42 and the crank arm 72 to provide balanced operation of the reciprocating pistons 56 upon rotation of the shaft 42.

During operation, fluid flows rapidly throughout the brake system 10, which causes the temperature of the fluid to rise. The present brake system 10 includes the fluid cooling system 30 (FIG. 1), which is configured for maintaining the temperature of the hydraulic fluid that flows through the cylinders 34 within acceptable ranges. Such cooling systems are well known in the art and need not be explained further. However, it is contemplated that in some embodiments that a second reservoir and a second cooling system may be used to cool fluid flowing through the fluid distribution system 24. In the present embodiment, if the fluid's temperature rises above its boiling point, then the efficiency of the fluid is greatly reduced, causing the braking system 10 to be less capable of generating a consistent braking force. Thus, the fluid cooling system 30 is in fluid communication with the fluid reservoir 28 to prevent such an occurrence.

FIG. 5 shows each cylinder 34 having a shaft 56 attached to a reciprocating piston 57. Each of the shafts 56 is reciprocal and has a fully retracted position, a fully extended position, and a half extended position such that when one of the shafts 56 is at either the fully extended position or the fully retracted position, the other shaft 56 is at the half retracted position and vice-versa.

The cylinders 34 are also disposed in the system 10 such that each reciprocating shaft 56 is connected to its respective crank arm 72. In addition, each crank arm 72 is preferably 90 degrees out of phase with respect to the other crank arm 72 upon rotation of both with the shaft 42. When the two crank arms 72 are out of phase with each other by 90 degrees, the braking system 10 is advantageously operating at maximum efficiency. That is, with the reciprocating shafts in the present orientation, a balanced braking force is applied to the shaft 42 and ultimately to the rotating part 14 when the brake pedal 20 is actuated. This is because, while one cylinder 34 is at its weakest force-applying position, the other cylinder 34 is at its strongest force-applying position. Accordingly, a 90 degree phase difference maximizes the efficiency and stability of the brake system 10.

Next, a second embodiment of the present invention will be described with like parts designated by the same reference numerals. In the second embodiment, the electronic control unit 36 briefly discussed with respect to FIG. 1 is provided for controlling the braking force applied via the cylinders 34 by controlling fluid flow through the first fluid control unit 26 and/or the second fluid control unit 32. The main difference between the first embodiment and the second embodiment is that in the first embodiment a mechanical linkage from the brake pedal actuates the first fluid control unit 26 and controls the amount of braking force applied. In the second embodiment, the electronic control unit 36 receives an electronic signal from the brake pedal, and the electronic control unit controls the first fluid control unit 26 and/or second fluid control unit 32 and the amount of braking force.

The electronic control unit 36 of the present invention receives a signal from the brake pedal 20 that allows the electronic control unit to determine how fast and how much braking force should be applied. More specifically, the electronic control unit 36 transmits a first control signal (not shown) to the first fluid control unit 26 and a second control signal (not shown) to the second fluid control unit 32 for controlling the amount of fluid pressure in the cylinders 34. For simplicity, FIG. 1 shows connections between the electronic control unit 36 and other components of the brake system 10 in dashed lines. However, other equivalent electronic connection scenarios are contemplated. As the fluid flow between sides of the cylinders 34 becomes more restricted, the braking force or drag resistance created by the cylinders 34 for slowing down and/or stopping the rotating part 14 increases.

After the electronic control unit 36 receives an actuation signal from the brake pedal 20, the electronic control unit 36 sends the first control signal to the first fluid control unit 26. Once the first fluid control unit 26 receives the first control signal, the fluid piston 48 inside the first fluid control unit 26 can be actuated from an open position toward the closed position, causing the fluid flow in the brake system 10 to decrease, and eventually stop when in the closed position.

In addition to the first control signal, the electronic control unit 36 may optionally transmit the second control signal to the second fluid control unit 32 for regulating the amount of fluid flow between sides of the cylinders 34. Preferably, the electronic control unit 36 is pre-programmed to provide the second control signal to the second fluid control unit 32 so as to preset the second control unit at a fixed setting depending on the desired braking range required for the first fluid control unit 26. As discussed above, the second fluid control unit 32 may be a pressure controlling ball valve, an electronically controlled solenoid valve, a check valve, etc., that is capable of operating in response to a control signal.

With the present system 10, it is envisioned that the electronic control unit 36 may control first fluid control unit 26 and/or the second fluid control unit 32 in a manner that creates an anti-lock braking system. To create such a braking system, the electronic control unit 36 transmits a first control signal that causes the first fluid control unit 26 to rapidly increase and decrease the flow of fluid into and out of the sides of the cylinders 34. In addition, the electronic control unit 26 may also transmit a second control signal that causes the second fluid control unit 32 to rapidly increase and decrease fluid flow in the cylinders 34. Thus, the cylinders 34 will not "lock up" and cause the rotating part 14 to stop rotating immediately. Rather the rotating part 14 will gradually decrease its rotational speed so that a driver can more easily maintain control of the vehicle 12.

It is also contemplated that the present braking system 10 may be used with conventional drum brakes. In this configuration, the drum brakes may be used as a parking brake, while the present invention is used as described above for providing full braking functionality. Moreover, while the present invention is shown with two hydraulic cylinders, it is envisioned that additional hydraulic cylinders may be integrated with the present braking system 10.

Although not illustrated in the drawings, it is further contemplated that the present brake system 10 can include a fluid adding member for adding fluid to the fluid reservoir 28 in the event of a fluid leakage, as is known to those skilled in the art. Moreover, in alternative embodiments it is contemplated that the first control unit could be preset in a fixed position, and that each of the lines 50 connected to sides of the cylinders 34 could include respective second control units that are operated in unison in response to the second control signal.

While particular embodiments of the present breaking system for a vehicle have been described herein, it will be appreciated by those skilled in the art that changes and modifications may be made thereto without departing from the invention in its broader aspects and as set forth in the following claims.

What is claimed is:

1. A brake system for a vehicle having a brake pedal, and at least one rotational part, comprising:
   a shaft connectable to the rotational part;
   a first fluid control unit configured for actuating in response to manipulation of the brake pedal for controlling fluid flow to effect braking force;
   at least two cylinders in fluid communication with said first fluid control unit and each having a first cylinder end having an associated reciprocating piston and a second cylinder end configured for connection to the vehicle;
   a linkage, connecting each first cylinder end of an associated reciprocating piston to said shaft to provide balanced operation of said reciprocating pistons upon rotation of said shaft; and
   a second fluid control unit communicating with said first fluid control unit, wherein said first fluid control unit is configured for regulating fluid flow between opposing sides, which are separated by said associated piston, of a respective cylinder for each of said cylinders.

2. The brake system of claim 1, wherein said first fluid control unit comprises a housing having a fluid piston configured for reciprocating therein between an open position and a closed position and being biased toward said open position.

3. The brake system of claim 2, wherein said housing comprises a generally cylindrical member having a first housing end configured for receiving only a rod of said fluid piston therethrough and a second housing end having a plurality of fluid exchange ports.

4. The brake system of claim 3, further comprising a fluid reservoir connected to one of said fluid exchange ports.

5. The brake system of claim 4, further comprising a fluid cooling system configured to decrease a temperature of said fluid and in fluid communication with said fluid reservoir.

6. The brake system of claim 3, wherein said at least two cylinders have ports at each of said first and second housing ends of said cylinders, each said cylinder port separately connected to one of said fluid exchange ports of said generally cylindrical member.

7. The brake system of claim 1, wherein said second fluid control unit includes at least one valve.

8. The brake system of claim 1, wherein said linkage is provided with:
   a crank arm having one end connected to said shaft and an opposing end; and
   a ball joint having a pivotable end part connected to said opposing end of said crank arm and an elongated end part connected to said first cylinder end of one of said cylinders, said pivotable end part configured for providing balanced operation of said reciprocating pistons upon rotation of said shaft.

9. The brake system of claim 1, wherein said at least two cylinders include:
   a first cylinder having a first reciprocating piston; and
   a second cylinder having a second reciprocating piston, wherein each of said first and second reciprocating pistons have a fully retracted position, a fully extended position, and a half extended position such that said first reciprocating piston is at one of said fully extended position and said fully retracted position when said second piston is at said half retracted position and vice-versa.

10. The brake system of claim 1, wherein said at least two cylinders comprise:
    a first cylinder having a first reciprocating piston; and
    a second cylinder having a second reciprocating piston, and
    wherein said first reciprocating piston is connected to a first crank arm, said second reciprocating piston is connected to a second crank arm, and said first crank arm is generally 90 degrees out of phase with respect to said second crank arm upon rotation of both said first crank arm and said second crank arm about said shaft.

11. A brake system for slowing or stopping a rotational part by disturbing or stopping a flow of fluid, comprising:
    a shaft connectable to the rotational part;
    an electronic control unit configured for generating at least one control signal;
    a first fluid control unit actuated in response to said at least one control signal generated by said electronic control unit;
    at least two cylinders in fluid communication with said first fluid control unit and each having a first cylinder end having an associated reciprocating piston and a second cylinder end opposing said first cylinder end;
    at least two linkages, each connected to said at least one rod end and to said shaft of a respective reciprocating piston for providing balanced operation of the reciprocating pistons upon rotation of said shaft; and
    a second fluid control unit in fluid communication with said first fluid control unit, wherein said first fluid control unit is configured for regulating fluid flow between opposing sides, which are separated by said associated piston, of a respective cylinder for each of said cylinders.

12. The brake system of claim 11, wherein said electronic control unit generates a second control signal configured for operating said second fluid control unit.

13. The brake system of claim 11, wherein said second fluid control unit includes at least one electronic valve.

14. The brake system of claim 11, wherein said first fluid control unit comprises a housing having a fluid piston configured for reciprocating therein between an open position and a closed position and biased toward said open position.

15. The brake system of claim 11, further including a gear assembly for connecting said shaft to said rotational part.

16. The brake system of claim 11, further comprising:
    a fluid reservoir in fluid communication with said first fluid control unit; and a fluid cooling system configured for decreasing a temperature of said fluid and in fluid communication with said fluid reservoir.

17. The brake system of claim 11, wherein each of said at least two linkages further comprises:
   a crank arm having one end connected to said shaft and an opposing end; and
   a ball joint having a pivotable end part connected to said opposing end of said crank arm and an elongated end part connected to said rod end of said cylinder, said pivotable end part configured for providing balanced operation of said reciprocating pistons upon rotation of said shaft.

18. The brake system of claim 11, wherein each of said at least two cylinders further comprise:
   a first cylinder having a first said reciprocating piston; and
   a second cylinder having a second said reciprocating piston,
   wherein each of said first and second reciprocating pistons have a fully retracted position, a fully extended position, and a half extended position such that said first reciprocating piston is at one of said fully extended position and said fully retracted position when said second piston is at said half retracted position and vice-versa.

19. The brake system of claim 18, wherein said second fluid control unit comprises a pair of valves, each valve connected to different ones of said first and second cylinders and regulating a flow of said fluid to sides of respective said first and second cylinders.

20. The brake system of claim 11, wherein each of said at least two cylinders further comprise:
   a first cylinder having a first said reciprocating piston; and
   a second cylinder having a second reciprocating piston,
   wherein each of said at least two second linkages further comprise:
   a first crank arm connected to said first reciprocating piston; and
   a second crank arm connected to said second reciprocating piston, and
   wherein said first crank arm is 90 degrees out of phase with respect to said second crank arm upon rotation of both said first crank arm and said second crank arm with said shaft.

* * * * *